C. F. PEARSON.
GREASE CATCHING DEVICE FOR AUTOMOBILES.
APPLICATION FILED OCT. 9, 1916.
1,231,189.
Patented June 26, 1917.
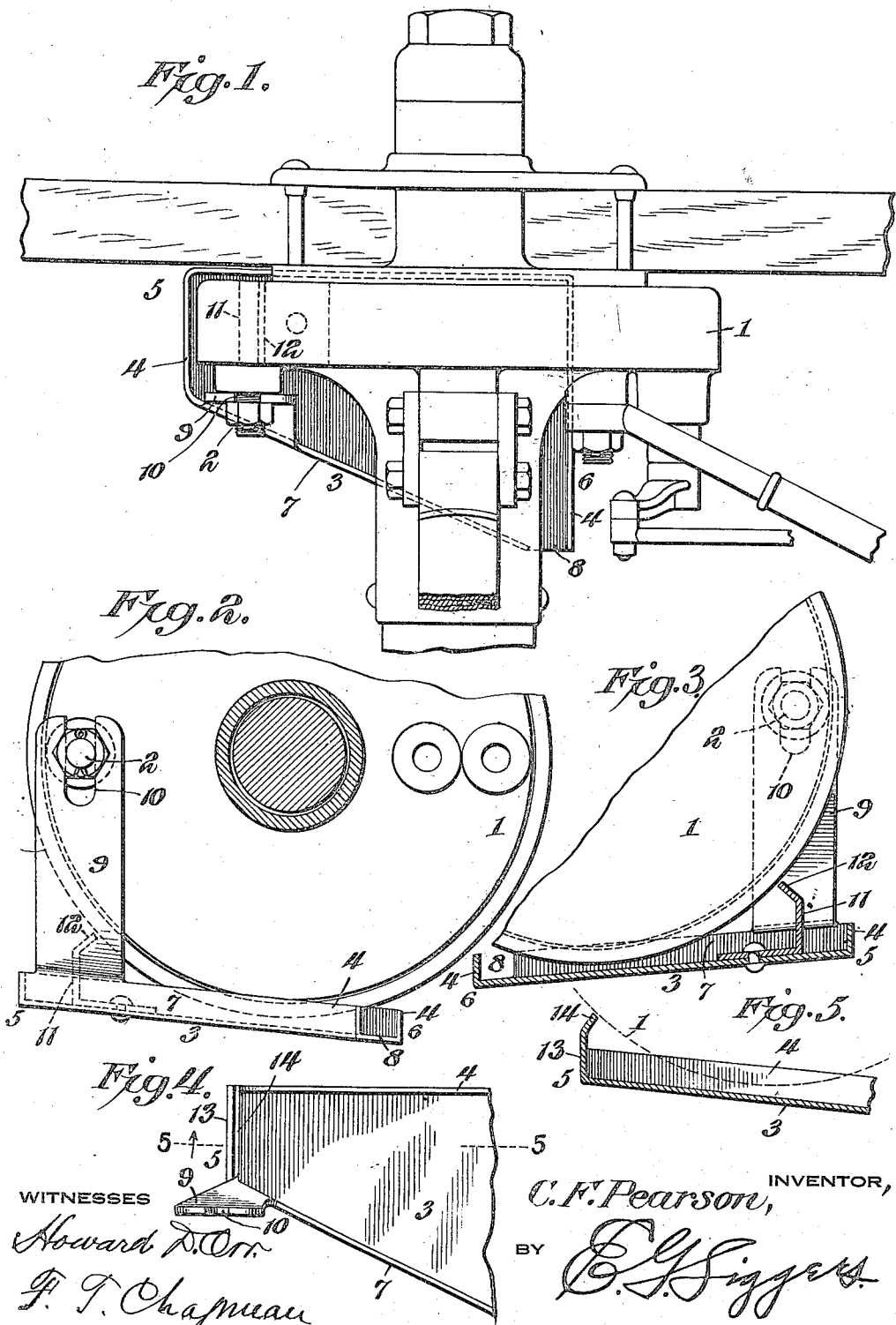

UNITED STATES PATENT OFFICE.

COLEMAN FERRELL PEARSON, OF MONTGOMERY, ALABAMA.

GREASE-CATCHING DEVICE FOR AUTOMOBILES.

1,231,189.  Specification of Letters Patent.  Patented June 26, 1917.

Application filed October 9, 1916. Serial No. 124,746.

*To all whom it may concern:*

Be it known that I, COLEMAN FERRELL PEARSON, a citizen of the United States, residing at Montgomery, in the county of Montgomery and State of Alabama, have invented a new and useful Grease-Catching Device for Automobiles, of which the following is a specification.

This invention has reference to grease catching devices for automobiles, and its object is to provide a simple and readily attached grease catching device especially intended for application to the rear axle brake drum of a Ford automobile.

The invention comprises a sheet metal pan with marginal flanges, which at one point are omitted to form an outlet, and the pan is provided with a slotted ear or carrier by means of which it may be readily attached to the rear axle brake-shoe bolt of the Ford automobile with a portion of the pan so related to the brake-shoe drum as to cause any grease which may escape from the drum to be directed into the pan and by the latter ultimately discharged toward the ground. By such means grease drippings escaping from the brake-shoe drum are prevented from reaching the rear wheel, thus soiling the latter, and also from reaching the rubber tires, grease being detrimental to the rubber.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a plan view of the brake-shoe drum and adjacent parts of a vehicle with the grease catching pan attached.

Fig. 2 is a side elevation with the axle in cross-section and looking toward the corresponding rear wheel, the latter being omitted.

Fig. 3 is a longitudinal section of the grease catching pan showing a small portion of the brake drum as viewed from the side opposite to that seen in Fig. 2.

Fig. 4 is a plan view of one end of a modified form of grease catching pan.

Fig. 5 is a section on the line 5—5 of Fig. 4.

While the invention is particularly designed for use with the Ford automobile, it may be employed with other makes of automobiles where like conditions prevail, and with such changes as to shape as may be needed to adapt the device to such other makes of automobile.

In the Ford automobile there is provided a brake drum 1 which is shown in the drawings without any attempt to illustrate specific features thereof. Such brake drum, which is carried by the rear axle, is provided with a bolt 2 for the rear axle brake shoe.

The invention comprises a pan 3 which may be conveniently made of sheet metal, in most part of one piece struck up or otherwise formed, with the pan provided with marginal upstanding flanges 4, the expressions of position having to do with the installed condition of the pan. At one end 5 the pan is comparatively narrow, but wide enough to there underride the drum 1, while at the other end 6 the pan is comparatively wide and is provided with one side 7 expanding from the narrow end toward the wide end where the flanges bordering the pan are omitted for a short distance to produce an outlet 8. Rising from the flange 7 is an ear 9 of sufficient length to constitute a suspension means for the pan, the ear terminating at what constitutes its upper end in a longitudinal slot 10 permitting the application of the ear to the stem of the bolt 2 with the nut of the bolt clamping the ear in place. By arranging the pan so that in its installed position it slopes toward the mouth 8 any grease caught in the pan will gravitate toward and be discharged from the mouth or outlet 8, which latter is located at such a distance from the brake drum in a direction away from the adjacent wheel that grease will be discharged from the outlet 8 to the ground in such spaced relation to the wheel that there is no liability of any of the grease reaching the wheel or the tire of the wheel. Consequently there is no contamination of the spokes or rim of the wheel and no grease finds access to the tire to rot or otherwise injure the material of the tire.

Within the pan 3 and fast to the bottom thereof is a blade 11 so positioned that its upper or free end 12 is in close relation to the periphery of the drum. The blade is positioned to the rear of the drum in the direction of travel in order that leaking grease instead of being thrown from the drum will be caught by the blade, and especially by the free end 12, which is bent forwardly to serve as a catch member for the grease. As soon as the grease leaves the revolving drum and is caught by the blade 11 it will gravitate along the latter to the pan and finally escape from said pan. It is not necessary that the blade 11 should touch the brake drum but it may be brought into close relation thereto. While it is preferable that the scraping blade should not actually touch the drum, it may, if desired, touch it.

In Figs. 1, 2 and 3 the blade 11 is made separately from the pan, while in Figs. 4 and 5 there is shown a construction whereby the blade is made in one piece with the pan. The blade indicated at 13 in Figs. 4 and 5 may form a part of what constitutes the rear end wall or flange of the pan but rises to a greater height and terminates in an angle portion 14 constituting the scraper, which may or may not be brought into actual contact with the peripheral surface of the drum. The pan is provided with an ear 9 having a slotted portion 10 as in the structure of Figs. 1, 2 and 3.

The device may be readily constructed of sheet metal and can be stamped into shape, especially in the structure of Figs. 4 and 5, while the structure of Figs. 1, 2 and 3 has a separately formed scraper 11 riveted or otherwise made fast to the body of the pan. The action is the same in both forms.

In order that an idea may be obtained as to the general proportions of the device, it may be stated that the brake drum of a Ford automobile is about eight inches in diameter, in which case the pan may be three and one-half or four inches long and otherwise proportioned to perform the function for which it is intended.

What is claimed is:—

1. A grease catching device for the brake drums of automobiles, comprising a shallow pan shaped to direct grease away from the drum and from the wheel carrying the drum, and provided with a discharge opening, said pan having means for suspending it from the drum and also provided with a blade adapted to be brought into such relation to the periphery of the drum as to catch grease accumulating on the periphery of the drum.

2. A means for catching and diverting grease leaking from the brake drum of an automobile, comprising a shallow pan increasing in width from one end toward the other and provided with an outlet near one side of the wide end and with suspending means near one side of the narrow end and at said narrow end having grease engaging means adapted to be brought into close relation to the peripheral portion of the drum.

3. A pan for catching drippings of grease from the brake drum of an automobile, said pan having an escape opening for directing grease away from the wheel of the automobile adjacent to the brake drum and also provided with a suspending ear adapted to be attached to a bolt present on the brake drum and with a blade for engaging grease accumulating on the periphery of the drum and directing it into the pan.

4. A drip pan for attachment to the brake drum of an automobile, said pan being of shallow depth with marginal walls and widening from one end toward the other with an escape opening at the wide end, an attaching ear near the narrow end of the pan and adapted to be engaged by a bolt present on the brake drum, and a blade carried by the pan for engaging grease accumulating on the peripheral portion of the drum and directing the grease into the pan.

5. A drip pan for attachment to the brake drum of an automobile, said pan being of shallow depth with marginal walls and widening from one end toward the other with an escape opening at the wide end, an attaching ear near the narrow end of the pan and adapted to be engaged by a bolt present on the brake drum, and a blade carried by the pan for engaging grease accumulating on the peripheral portion of the drum and directing the grease into the pan, said blade rising above the top of the pan and bent at the free end to be directed toward the periphery of the brake drum when the pan is installed.

In testimony that I claim the foregoing as my own, I have hereto affixed my signature in the presence of two witnesses.

COLEMAN FERRELL PEARSON.

Witnesses:
G. W. GONZALEZ,
C. R. JENKINS.

Copies of this patent may be obtained for five cents each, by addressing the "Commissioner of Patents, Washington, D. C."